(12) United States Patent
Günther et al.

(10) Patent No.: US 12,304,562 B2
(45) Date of Patent: May 20, 2025

(54) HOLLOW CHAMBER SUPPORT ASSEMBLY FOR A VEHICLE

(71) Applicant: Kirchhoff Automotive Deutschland GmbH, Attendorn (DE)

(72) Inventors: Alexander Günther, Olpe (DE); Lena Kremer, Finnentrop (DE)

(73) Assignee: Kirchhoff Automotive Deutschland GmbH, Attendorn (DE)

( * ) Notice: Subject to any disclaimer, the term of this patent is extended or adjusted under 35 U.S.C. 154(b) by 379 days.

(21) Appl. No.: 18/008,284

(22) PCT Filed: Jun. 15, 2021

(86) PCT No.: PCT/EP2021/066144
§ 371 (c)(1),
(2) Date: Dec. 5, 2022

(87) PCT Pub. No.: WO2021/255042
PCT Pub. Date: Dec. 23, 2021

(65) Prior Publication Data
US 2023/0202567 A1      Jun. 29, 2023

(30) Foreign Application Priority Data
Jun. 17, 2020   (DE) ............... 10 2020 115 953.6

(51) Int. Cl.
*B62D 29/00* (2006.01)
*B62D 21/15* (2006.01)
(Continued)

(52) U.S. Cl.
CPC ......... *B62D 21/152* (2013.01); *B62D 29/005* (2013.01); *B60R 19/34* (2013.01);
(Continued)

(58) Field of Classification Search
CPC .. B62D 21/152; B62D 29/005; B62D 27/065; B62D 27/02; B62D 25/08; B60R 19/34
(Continued)

(56) References Cited

U.S. PATENT DOCUMENTS 6,378,933 B1    4/2002  Schoen
6,595,579 B2 *  7/2003  Freitag ................... B62D 25/04
                                                  296/193.06
(Continued)

FOREIGN PATENT DOCUMENTS

DE    4138778 A  *  6/1992  ........... B62D 21/152
DE    4138778 A1    6/1992
(Continued)

OTHER PUBLICATIONS

Pending U.S. Appl. No. 17/915,057, filed Sep. 27, 2022, inventors Gunther et al., applicant Kirchhoff Automotive Deutschland GmbH [Per MPEP 609.07].
(Continued)

*Primary Examiner* — Amy R Weisberg
*Assistant Examiner* — Dana D Ivey
(74) *Attorney, Agent, or Firm* — Polson Intellectual Property Law P.C.; Margaret Polson; Christopher Sylvain

(57) ABSTRACT

A hollow chamber support assembly for a vehicle comprising a hollow chamber support, an insert component designed as a hollow chamber profile, which is arranged in the hollow chamber support with the outer sides of the walls of the insert component spaced apart from the inner wall of the hollow chamber support, and means for holding a first end section of the insert component on an end of the hollow chamber support in its arrangement provided in the hollow chamber support(. The means are designed as clamping means and comprise a clamping element and an abutment element, wherein to clamp the insert component, the clamp-
(Continued)

ing element is supported on the abutment element and, in this supported arrangement, acts against the outer side of at least one wall of the insert component.

24 Claims, 5 Drawing Sheets

(51) Int. Cl.
    *B60R 19/34*       (2006.01)
    *B62D 25/08*       (2006.01)
    *B62D 27/02*       (2006.01)
    *B62D 27/06*       (2006.01)

(52) U.S. Cl.
    CPC .............. *B62D 25/08* (2013.01); *B62D 27/02* (2013.01); *B62D 27/065* (2013.01)

(58) Field of Classification Search
    USPC .................................................... 296/187.09
    See application file for complete search history.

(56) References Cited

U.S. PATENT DOCUMENTS

| | | |
|---|---|---|
| 8,950,794 B2 | 2/2015 | Lenkenhoff |
| 9,446,799 B2 | 9/2016 | Franzpötter |
| 9,598,100 B2 | 3/2017 | Lenkenhoff |
| 9,764,764 B2 | 9/2017 | Irle |
| 10,005,495 B2 | 6/2018 | Töller |
| 10,214,169 B2 * | 2/2019 | Schneider ............... B60R 19/18 |
| 10,577,025 B2 | 3/2020 | Michler |
| 10,882,559 B2 | 1/2021 | Gündogan |
| 11,142,248 B2 | 10/2021 | Günther |
| 11,148,623 B2 | 10/2021 | Günther |
| 11,235,720 B2 | 2/2022 | Höning |
| 11,292,409 B2 | 4/2022 | Töller |
| 11,505,146 B2 | 11/2022 | Weige |
| 2019/0344385 A1 | 11/2019 | Töller |
| 2022/0009435 A1 | 1/2022 | Günther |
| 2022/0024399 A1 | 1/2022 | Tlauka |
| 2022/0258684 A1 | 8/2022 | Günther |
| 2022/0281532 A1 | 9/2022 | Tentscher |
| 2022/0289304 A1 | 9/2022 | Weige |
| 2022/0297524 A1 | 9/2022 | Günther |
| 2022/0314912 A1 | 10/2022 | Töller |
| 2022/0363211 A1 | 11/2022 | Günther |
| 2023/0039843 A1 | 2/2023 | Gündogan |

FOREIGN PATENT DOCUMENTS

| | | | |
|---|---|---|---|
| DE | 10117009 A1 | 10/2002 | |
| EP | 1331159 A2 * | 7/2003 | ........... B62D 21/152 |

OTHER PUBLICATIONS

Pending U.S. Appl. No. 17/914,465, filed Sep. 26, 2022, inventors Gunther et al., applicant Kirchhoff Automotive Deutschland GmbH [Per MPEP 609.07].
Pending U.S. Appl. No. 17/912,589, filed Sep. 19, 2022, inventor Lagin, applicant Kirchhoff Automotive Deutschland GmbH [Per MPEP 609.07].
International Search Report dated Sep. 16, 2021 in parent international application PCT/EP2021/066144.
Written Opinion of the International Searching Authority dated Sep. 16, 2021 in parent international application PCT/EP2021/066144.

* cited by examiner

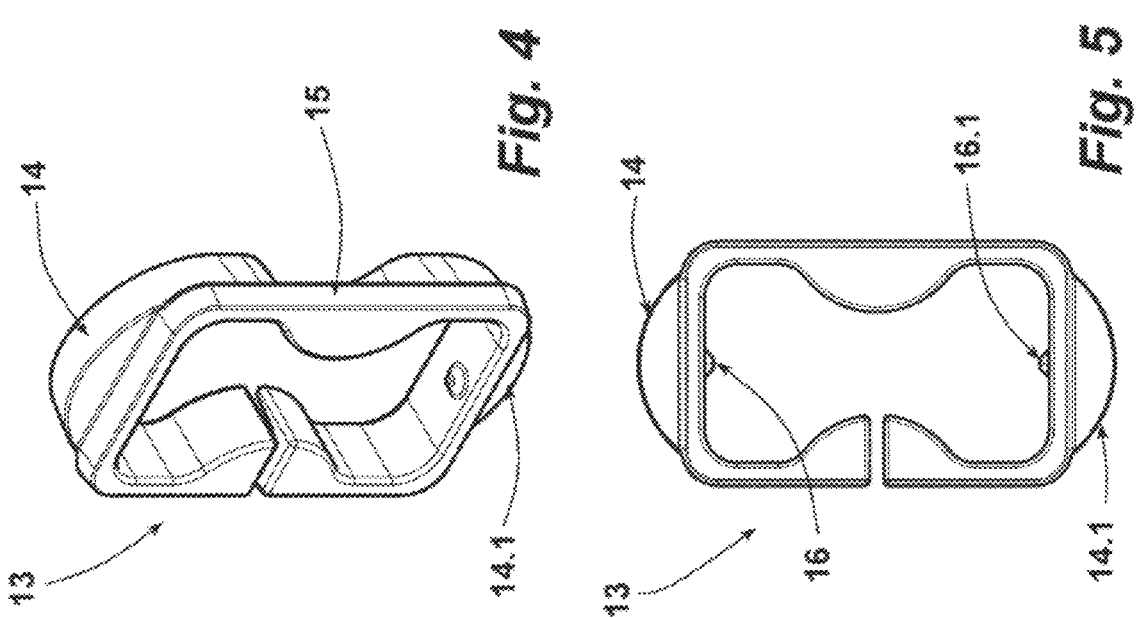
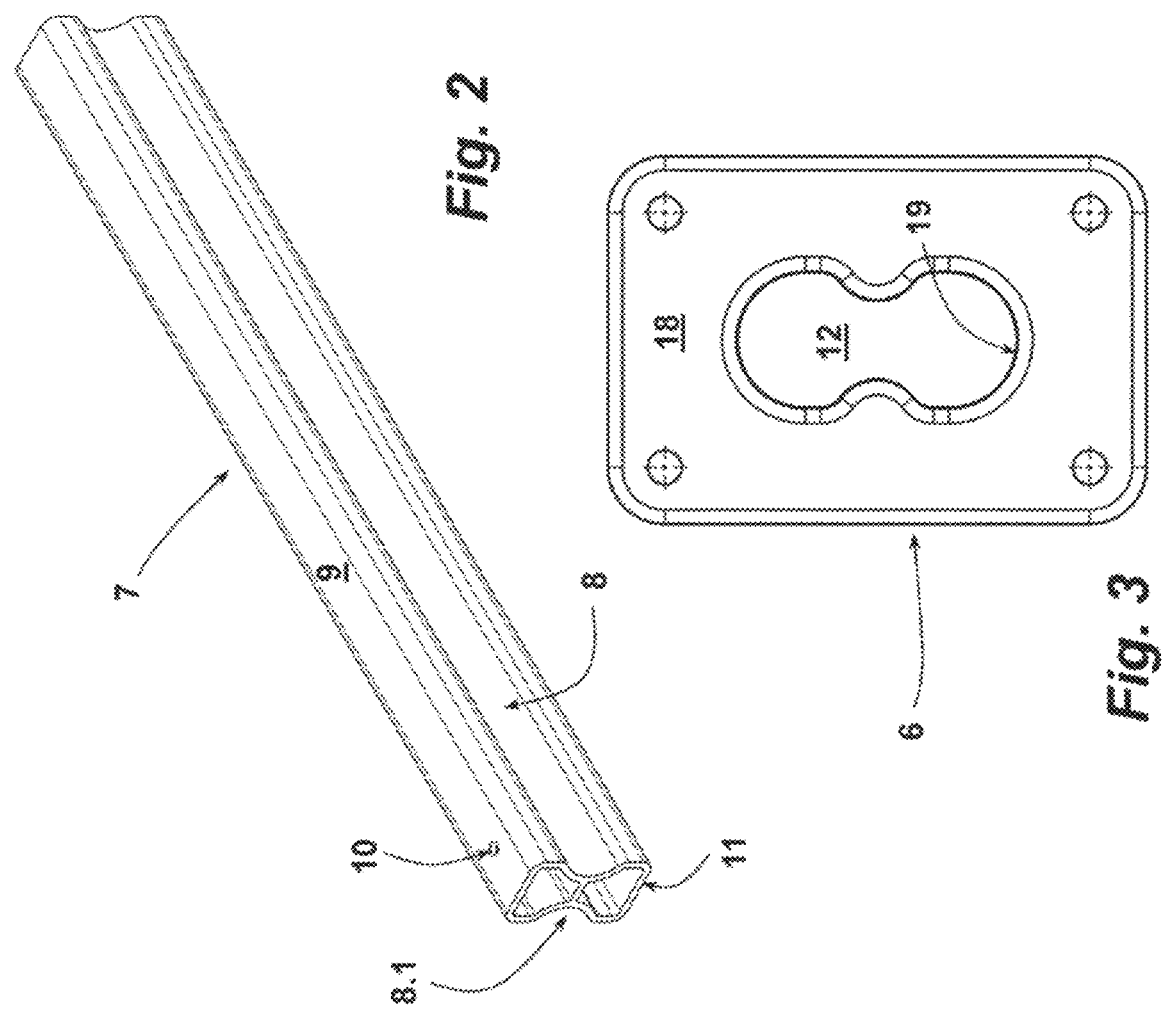

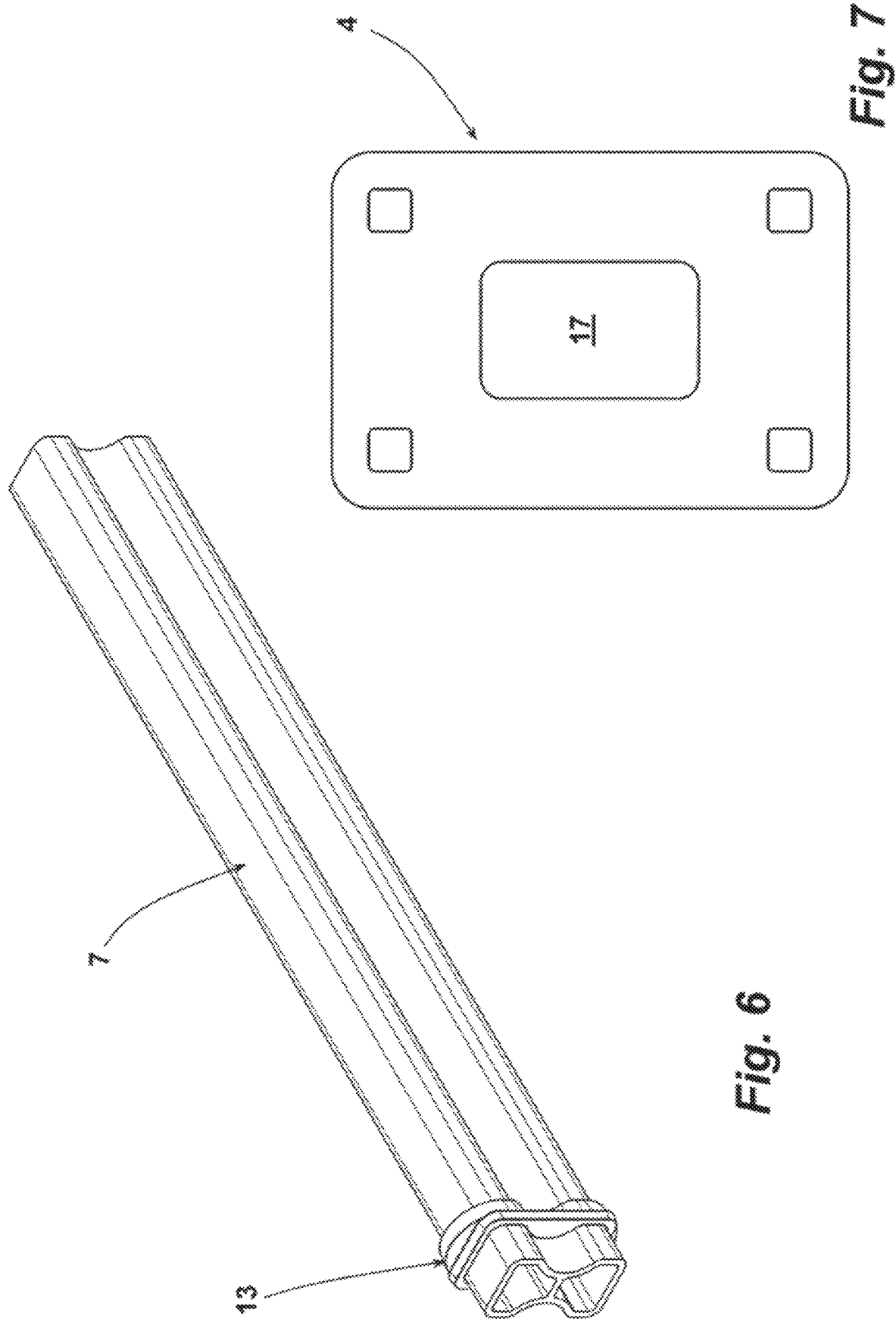

HOLLOW CHAMBER SUPPORT ASSEMBLY FOR A VEHICLE

BACKGROUND

The present disclosure relates to a hollow chamber support assembly for a vehicle.

In vehicles, typically motor vehicles, hollow chamber supports are used at different positions, for example as longitudinal supports, rocker panels, instrument panel supports, or the like. With regard to their design, such hollow chamber supports are adapted to the respective requirements, namely with regard to their geometry, the material thickness (wall thickness), the material used, and a combination of these or also other features.

U.S. Pat. No. 6,378,933 B1 discloses a reinforcement of hollow chamber supports by means of inserted additional elements which are fastened to the hollow chamber support by means of screws. In addition, the hollow chamber support is filled with foam.

DE 101 17 009 A1 discloses a support column for a body frame of a motor vehicle having an additional tubular body. The tubular body is welded to the half-shell-shaped support column by means of an adapter plate.

Such hollow chamber supports must also meet the requirements placed on crash performance in accordance with their use. For this and other reasons, it is fundamentally necessary to design different hollow chamber supports for the respective purposes, for example used as longitudinal supports, for different vehicles, for example different in their weight. In order to simplify the production process of motor vehicles, a move has been made some time ago to develop platforms so that, as much as possible, the same parts can be used for different vehicles. In the more recent past, more and more vehicle derivatives, in particular also in smaller series, have been derived from the existing platforms, for example in connection with the development of vehicles driven by electric motors, whether hybrid-drive vehicles or purely electric vehicles. With regard to the weight of the vehicles, the battery modules above all are decisive for the weight of such derivatives, because of which, for example, a vehicle equipped as a solely electric vehicle has a higher weight for this reason than the same vehicle if designed as a hybrid, since the latter only has to carry a fraction of the battery volume as a solely electrically powered vehicle. The same vehicle is even lighter in weight than a hybrid vehicle if it is only equipped with an internal combustion engine. If the same longitudinal supports are to be used in this example for the vehicle types, following the platform concept, this means that the design thereof has to be oriented to the vehicle that places the highest demands on such a longitudinal support. In this example, this would be the vehicle having the highest weight. It is true that the same longitudinal supports can then be used for all vehicle types. However, the longitudinal supports are then oversized for the lighter vehicles. These vehicles are therefore burdened with unnecessary weight.

SUMMARY

In principle, it could be considered that the platform concept outlined above is changed so that the platform component—the base component—is such a hollow chamber support that does not meet the highest requirements, but only lower requirements, typically those that such a component has in a vehicle having lower requirements. If such a component is installed in a vehicle that places higher demands on this component, this component is reinforced or stiffened using suitable measures. Each vehicle is then equipped with the component that is tailored for it and that satisfies the requirements placed on this component by the vehicle.

This approach is taken up by the present disclosure. An aspect of the present disclosure is based on proposing a hollow chamber support assembly for a vehicle for this concept, which allows a hollow chamber support as a base component to be equipped in a simple and problem-free manner when used for a vehicle in which higher requirements are placed on this component, for example by a higher weight or a stronger engine.

This is achieved by a hollow chamber support assembly for a vehicle, comprising:

a hollow chamber support, an insert component designed as a hollow chamber profile, which is arranged in the hollow chamber support having the outer sides of its walls spaced apart from the inner wall of the hollow chamber support, and means for holding the insert component with a first end section on an end of the hollow chamber support in its arrangement provided in the hollow chamber support, which means are designed as clamping means and comprise a clamping element and an abutment element, wherein to clamp the insert component, the clamping element is supported on the abutment element and acts in this support arrangement against the outer side of at least one wall of the insert component.

The directional designations used herein—x, y and z direction—are adapted to the longitudinal extension of the hollow chamber support or the insert component, wherein the x direction is the longitudinal extension of the component, the y direction is the horizontal transverse direction thereto, and the z direction is the vertical direction.

This hollow chamber support assembly has a hollow chamber support as the base component. This hollow chamber support is fundamentally suitable to be used in a vehicle even without the measures described hereinafter. However, if this hollow chamber support is to be installed in a vehicle in which higher requirements are placed on it, an additional insert component is used to complete the hollow chamber support assembly. The insert component is designed as a hollow chamber profile and is arranged and held in the hollow chamber support. Due to this measure, the hollow chamber support has become a hollow chamber support assembly having two hollow chamber supports located inside one another and thus nested with one another. The insert profile designed as a hollow chamber profile is designed differently in terms of its geometry, its wall thickness, its material, and/or other features to give this assembly together with the hollow chamber support those properties so that it meets the higher requirements placed on it. The insert component is held within the hollow chamber support with spacing from its inner wall. Thus, the insert component not only increases the wall thickness of the hollow chamber support, but at the same time additionally improves the load-bearing capacity due to the spacing between the walls, which then form an outer strap and an inner strap. Furthermore, it is ensured that the two components do not rattle against one another.

Clamping means are used to hold the insert component in its one end section. A clamping element and an abutment element are provided for this purpose. To clamp the insert component, the clamping element is supported on the abutment element and acts on the outside of the insert component. In this way, the insert component is fixed relative to the hollow chamber support surrounding it in the circumferential direction, typically also in the direction of its longitudinal extension.

The spacing of the insert component apart from the inner wall of the hollow chamber support also has the advantage that the insert component can have a different geometry than that specified by the inner outline geometry of the hollow chamber support. In many cases, such hollow chamber supports are composed of two or also more shell components, also as part of more comprehensive vehicle body components, wherein the shell components often have complicated three-dimensional geometries. In contrast, the insert component designed as a hollow chamber profile can be designed to be uniform or more or less uniform over its longitudinal extension. This means that an extruded profile can also be used as an insert component, the production of which will generally be more cost-effective than the production of such an insert component in a shell construction, particularly in the case of smaller piece counts. It is entirely possible to design such an insert component having a non-linear extension, for example having an S-shaped flexure contained therein. In some applications, the hollow chamber support itself is designed having an S-shaped flexure in the x-y plane. The spacing of the insert component apart from the inner wall of the hollow chamber support also enables an embodiment in which the insert component designed as a hollow chamber profile also has such a flexure, which is arranged offset relative to the flexure of the hollow chamber support in the x direction. Then, in the two components—the hollow chamber support and the insert component—potential kinks are arranged at different positions in the longitudinal extension of the hollow chamber support assembly due to the flexure, so that this assembly can absorb significantly more force before it buckles in or out.

A special feature of this hollow chamber support assembly is that the cavity of the hollow chamber support, which is present in any case, is used to arrange one or more reinforcing or stiffening insert components therein. Thus, no additional installation space is required. The insert component can be installed during assembly of the vehicle body as long as the hollow chamber support is still open at one end. In the case of a longitudinal support as a hollow chamber support, its forward-pointing end is the end that remains open during assembly until a bumper cross-member assembly having a crash box or baseplate is connected to it. Then, during assembly, the insert component can be pushed into the hollow chamber support and clamped with its outer end section using the clamping element and thus fixed in its spatial position at this end. This can be carried out easily and without any problems. In principle, no joint connections are required for this either. After assembly, the insert component will protrude from the hollow chamber support in a typically short end section. The assembly process can thus be monitored optically in a simple manner.

In one example embodiment of such a hollow chamber support assembly, a flange plate is used as the abutment element. This flange plate has a flange recess in which the at least one clamping element and the insert component engage. With such a design of the abutment element, the elements mentioned are arranged radially in relation to one another. The flange plate is located at the free end of the end section of the hollow chamber support and is connected thereto, typically welded. If the hollow chamber support is designed as a longitudinal support of a vehicle, it is usually equipped with a flange plate anyway at its end in question. This is used to connect a crash box as part of a bumper cross-member assembly to be mounted on it. Therefore, an element that is required in any case can be used in this hollow chamber support assembly for the stated purposes without additional parts being required in principle. This flange plate is provided with a flange recess through which the insert component can be pushed and on which the at least one clamping element for clamping the insert component is supported.

The at least one abutment surface of such a flange plate can be provided by the material thickness thereof. In another embodiment, it is provided that, in order to enlarge the abutment surface, it is provided by a flange or flange section that is angled relative to its base plate. This flange or flange section is bent over in the direction of the longitudinal extension of the insert component and delimits the flange recess. The entire flange recess is preferably bordered by such a bent-over peripheral flange. This contributes to the stiffening of the flange plate.

For further stiffening, such a flange plate can also have a peripheral flange on the outside, typically bent over in the same direction. Such a flange plate can be a stamped and bent part produced from a steel plate.

According to a preferred embodiment, the at least one abutment surface for the clamping element is made inclined relative to the longitudinal axis of the insert component, namely inclined from its free end in the direction toward its outer lateral surface. Due to this measure, the flange recess tapers in the direction of the hollow chamber of the hollow chamber support. This inclined at least one abutment surface, on which the clamping element for clamping the insert component is supported, is used as an adjusting bevel to improve the clamping of the insert component when the clamping element is supported thereon. The clamping force is increased as the clamping element engages deeper and deeper into the flange recess. Preferably, the surface of the clamping element that abuts such an abutment surface is inclined in the same direction and at the same angle, so that a planar contact is produced between the clamping element and the abutment surface.

According to a preferred embodiment, the clamping element has two clamping segments located opposite to one another with respect to the longitudinal axis of the insert component. In this way, a clamping force acting in the direction of the central longitudinal axis of the insert component can be provided by the clamping element for clamping the insert component. At the same time, this is held centered by the clamping element. Even if, in principle, two or more clamping elements can be used, each of which is supported on an abutment surface, for example the flange plate, a preferred embodiment provides that the clamping element is formed in one piece in the manner of a clamping sleeve. This facilitates the handling in the assembly and also allows the clamping element to be pre-fixed on the insert component until it is mounted in or on the hollow chamber support. Such a pre-fixing can take place by friction. However, a form fit acting in the x direction between the clamping element and the insert component is preferred, so that the position of the clamping element is precisely defined in relation to the longitudinal extension of the insert component. For this purpose, the clamping element can carry a cam that protrudes inward in the radial direction and engages in a corresponding opening or passage of the insert component. In order to provide somewhat more play for the clamping element during assembly so that it can be placed on the outside of the insert component, in a refinement such a clamping sleeve is slotted on one of its legs. This allows the clamping sleeve to be expanded more easily. In addition, this allows a better concentration of force for clamping the insert component in the clamping surfaces of the clamping element arranged in the radial direction in relation to the abutment surfaces. The inner contour of such a clamping sleeve is preferably designed complementary to the outer geometry of the insert component. With such an embodiment, the clamping sleeve also has a certain sealing function. In this way, a certain clamping pressure can be exerted peripherally on the insert component, which does not have to be peripherally uniform.

For the intended positioning of the clamping element in relation to the abutment surfaces, for example provided by the border of a flange recess of a flange plate, one embodiment provides that a stop panel is formed onto the clamping segments of the clamping element. At least one section of the stop panel projects beyond the outer contour of the clamping segments and is used as a stop to limit the amount by which the clamping segments can be inserted or pressed into the flange recess.

In an embodiment in which the abutment surfaces are provided by the border of a flange recess of a flange plate, fixing of the clamping element can be effectuated and secured by its engagement in the flange recess and its pressing against the insert component by using a further flange plate. This further flange plate is expediently the so-called baseplate, which is already present on the vehicle at the end of a crash box, in the design of such a hollow chamber support assembly in which the hollow chamber support is a longitudinal support of a vehicle. This second flange plate is also equipped with a flange recess, which acts against a surface of the at least one clamping element facing in the x direction and thus presses the at least one clamping element against the one or typically multiple abutment surfaces when the two flange plates are clamped together, in order in this way to provide the clamping force desired on the lateral surface of the insert component.

The clamping element is a plastic part, for example. In such an embodiment, this simultaneously provides a galvanic isolation between the hollow chamber support and the insert component, which is expedient if the two components are made of different materials.

The insert component is supported using further holding means in the area of its other end, which is located within the hollow chamber support, with respect to the inner wall of the hollow support profile, preferably also spaced apart in the manner of a floating or fixed bearing. These further holding means can also be a sleeve that is placed on the insert component in the area of its other end section and is fixed in the x direction, for example, in a form-fitting manner on the insert component or is already attached in the hollow chamber support and/or is made preassembled or integrated. It is also possible to provide individual support points. These support points are also typically produced from plastic to provide galvanic isolation. In one refinement of such an embodiment, it is provided that a plastic nut is arranged as a holding means on the outside of the insert component at its end located in the hollow chamber support. In such an embodiment, the insert component is fixed and clamped at its relevant end on the hollow chamber support using a screw that engages in this nut.

As a hollow chamber profile, the insert component can have quasi-arbitrary cross-sectional geometries. There is therefore a great deal of freedom of design with regard to the effects of reinforcement or stiffening of the hollow chamber support achievable by such an insert component. It is thus readily possible, depending on the intended use of such a hollow chamber support, to equip it with an insert component that satisfies lower requirements or also an insert component that satisfies higher requirements. The different design of the insert components is adapted to the forces to be absorbed, even if they are primarily designed to absorb forces in the x direction or in the transverse direction thereto and thus in the y or z direction. The same also applies, of course, to forces that only have a vectorial component in the above-mentioned directions. When absorbing forces in the y or z direction, the insert component can be stiffened by equipping the walls facing in such a direction with at least one groove as a stiffening bead following the longitudinal extension. This can be provided to the same extent or to a different extent on the walls opposite to the respective direction, or also only on one of these walls of the insert component.

If the hollow chamber support is a longitudinal support, the insert component stiffens it above all so that higher forces can be absorbed and it therefore buckles later in the event of a frontal collision. In this way, the crash performance of such a longitudinal support is significantly improved. In such a hollow chamber support assembly, in which the hollow chamber support represents a longitudinal support of the vehicle, one refinement provides that the insert component is held therein with its end arranged in the hollow chamber support in the manner of a loose bearing in relation to the forces to be absorbed in the event of an accident. The insert component is therefore not clamped in the hollow chamber support in the x direction. If a clamping screw is provided, using which the inner end of the insert component is secured, it is dimensioned in such a way that the desired floating bearing properties at this end of the insert component are not impaired. This screw simply shears off under the appropriate forces and therefore does not impede these properties. In such an embodiment, the two components—hollow chamber support and insert component—first react independently of one another when a force is absorbed, at least until the outer wall of the insert component has been brought against an inner wall of the hollow chamber support. This measure further improves the protection against buckling. Consequently, even higher forces can be absorbed before this assembly buckles in or buckles out.

BRIEF DESCRIPTION OF THE DRAWINGS

The present disclosure is described hereinafter using an example embodiment with reference to the attached figures, wherein:

FIG. 2 shows an insert component, integrated in a hollow chamber support of a hollow chamber support assembly of FIG. 1, FIG. 3 shows an isolated illustration of a flange plate attached to a hollow chamber support of the hollow chamber support assembly of FIG. 1, FIG. 4 shows a perspective illustration of a clamping element for clamping the insert component, FIG. 5 shows a front view of the clamping element of FIG. 4, FIG. 6 shows the insert component of FIG. 2 having the clamping element of FIGS. 4 and 5 fixed thereon, FIG. 7 shows an isolated illustration of the base plate, which is connected to the vehicle-side end of a crash box of the bumper assembly.

DETAILED DESCRIPTION

Figure 1:
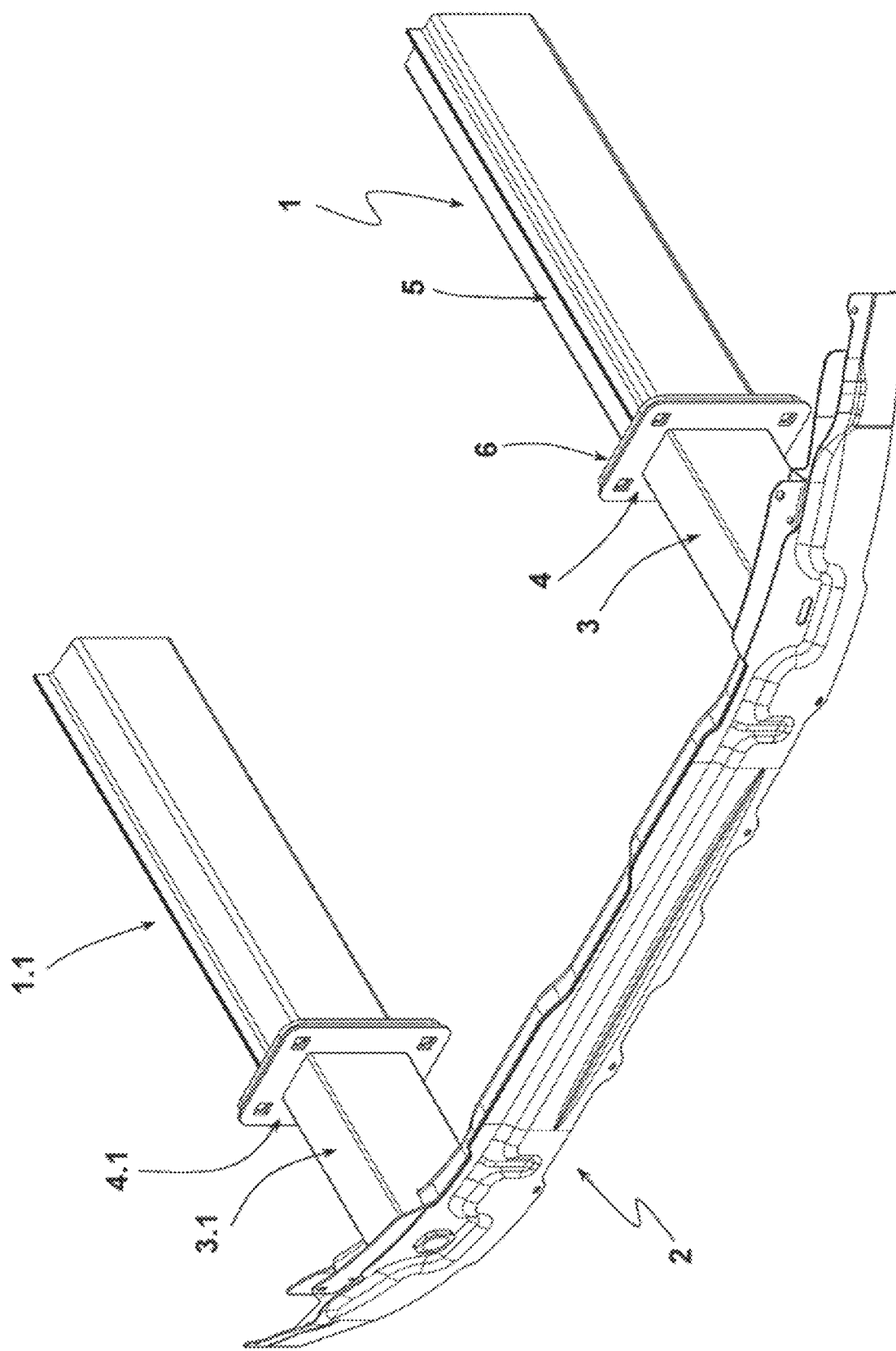
FIG. 1 shows a perspective illustration of two hollow chamber support assemblies, each having a hollow chamber support, connected by a bumper assembly.

FIG. 1 shows two hollow chamber support assemblies 1, 1.1. These represent the front longitudinal supports in a vehicle that is otherwise not shown in detail. A bumper cross-member assembly 2 is connected using its crash boxes 3, 3.1 to the hollow chamber support assemblies 1, 1.1. The crash boxes 3, 3.1 are each connected to a flange plate 4, 4.1 used as a baseplate. The bumper cross-member assembly 2 is connected to the hollow chamber support assembly 1 via the flange plates 4, 4.1.

The hollow chamber support assembly 1 is described in more detail hereinafter. The same explanations also apply to the hollow chamber support assembly 1.1, which is designed in the same way. The hollow chamber support assembly 1 comprises a hollow chamber support 5 which, in the example embodiment shown, is composed of two half-shells. The joining plane is in the x-z plane. The hollow chamber support 5 is shown in an illustrative form and can also have other geometries in a practical embodiment. The hollow chamber support 5 is connected to a flange plate 6 at the end facing towards the bumper cross-member assembly 2. The flange plates 4 and 6 protrude in the radial direction over the components connected to them by a joint connection—the crash box 3 and the hollow chamber support 5. The flange plates 4, 6 have openings in order to be able to connect the assemblies 1, 1.1, 2 to one another by means of fasteners. The fasteners are not shown in the figure.

In addition to the hollow chamber support 5, the hollow chamber support assembly 1 has an insert component 7 which is arranged in its cavity and follows its longitudinal extension. As is apparent from FIG. 2, the insert component 7 is designed as a hollow chamber profile. While the two half-shells of the hollow chamber support 5 are made of steel plates, the insert component 7 is an aluminum extruded profile in the example embodiment shown. The insert component 7 of the example embodiment shown is designed having two chambers. A groove-like depression 8, 8.1, following the longitudinal extension of the insert component 7, is provided in each of the side walls facing in the y direction. The recess 8, 8.1 is symmetrical to the central longitudinal plane (plane in the x-z direction) in both walls. Due to the recesses 8, 8.1, the insert component is tapered in the z direction in its middle section. In the upper wall 9 of the insert component 7, a locking opening 10 is introduced by a drilled hole. Opposite the locking opening 10 apparent in FIG. 2, there is also such a locking opening 10.1 at the same position in the lower wall 11 (see FIG. 9).

FIG. 3 shows a front view of the flange plate 6. A flange recess 12 is introduced into this plate, the inner contour of which corresponds to the outline geometry of the insert component 7. The insert component 7 is inserted through the flange recess 12 to complete the hollow chamber support assembly 1. The clear width of the flange recess 12 is dimensioned larger than the dimensioning of the insert component 7 in this respect. This takes place against the background that a clamping element 13 is arranged between the border of the flange recess 12 of the flange plate 6 and the insert component 7.

Such a clamping element 13 is shown in FIGS. 4 and 5. The clamping element 13 of the illustrated embodiment has two clamping segments 14, 14.1, which are opposite to one another with respect to the central transverse plane (x-y plane). The outer contour of the clamping elements 14, 14.1 is adapted to the inner contour of the flange recess 12 so that both surfaces are in planar contact with one another when the clamping element 13 is inserted into the flange recess 12. A stop panel 15 is formed onto the clamping elements 14, 14.1. The stop panel 15 protrudes in parts in the radial direction and thus outwards over the clamping segments 14, 14.1. These sections act as a stop to limit the insertion depth of the clamping segments 14, 14.1 into the flange recess 12 of the flange plate 6. While the clamping segments 14, 14.1 follow the inner contour of the flange recess 12, the stop panel 15 is formed having a rectangular outline. Thus, above all, those sections that protrude over the waist of the flange recess 12 form the above-described stop surface. As is apparent from FIGS. 4 and 5, the height of the stop panel 15 is less than the distance of the vertex of the clamping segment 14 from that of the clamping segment 14.1. The clamping segments 14, 14.1 thus protrude with their upper or lower section over the upper or lower end of the stop panel 15, respectively.

The clamping element 13 is formed in one piece in the manner of a clamping sleeve. The left leg shown in FIGS. 4 and 5 is slotted. This facilitates mounting of the clamping element 13 on the insert component 7. Each clamping segment 14, 14.1 carries a locking cam 16, 16.1 on its side facing inwards. These are used to fix the clamping element 13 on the insert component 7 and, in the fixed position, engage in the locking openings 10, 10.1. The slotted design can be formed as a continuous slot. It is also possible that the parts of the clamping sleeve enclosing the slot are connected to one another by a film section in the manner of a film hinge with a certain material specification. The expansion movement is then limited according to the material specifications. For example, such a film hinge section can have a V-shaped cross section, wherein the free ends are molded onto the components of the clamping collar that delimit the slot.

FIG. 6 shows the clamping element 13 mounted on the insert component 7. With the clamping element 13 mounted on the insert component 7, it is pushed into the flange recess 12 of the flange plate 6 when the hollow chamber support 5, which is the case with the hollow chamber support assembly 1, is supposed to be reinforced or stiffened.

Figure 8:
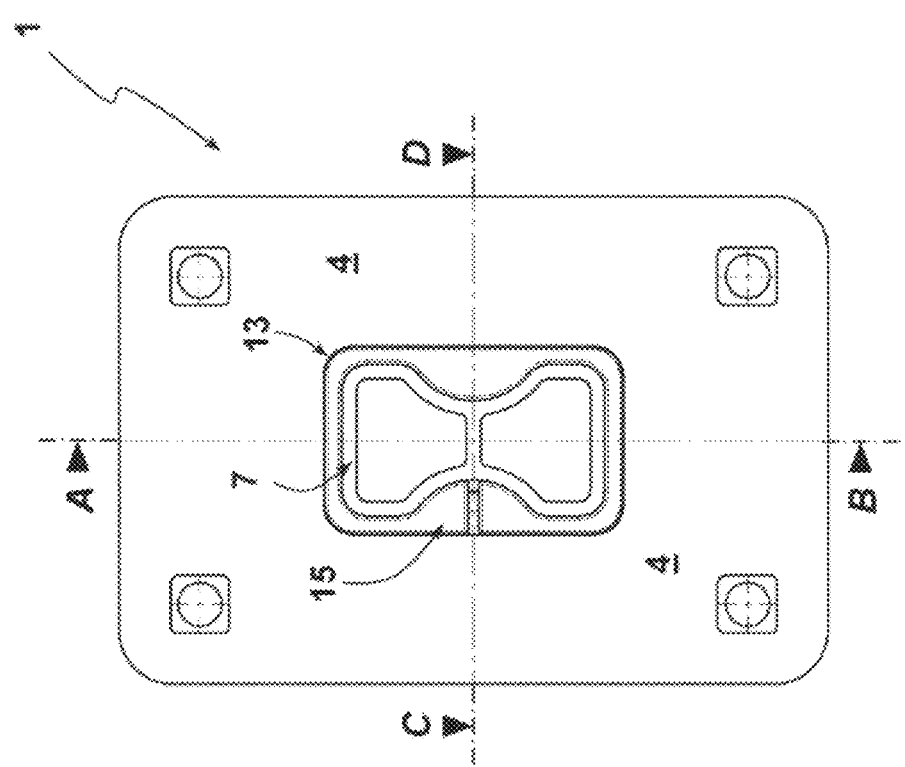
FIG. 8 shows a front view of one of the hollow chamber support assemblies of FIG. 1 with a view of the baseplate and with the crash box omitted.

FIG. 7 shows the flange plate 4, to which the crash box 3 is connected, in an isolated illustration in a top view. The flange plate 4 also has a flange recess 17. This is complementary to the outline geometry of the stop panel 15. If the insert component 7 having its clamping element 13 is pushed through the flange recess 12 of the flange plate 6 and the clamping element 13 is pressed into the flange recess 12, the clamping element 13 is pressed into the flange recess 12 of the flange plate 6 with force by the mounting of the bumper cross-member assembly 2 having its flange plate 4. FIG. 8 shows a front view of the mounted flange plate 4 and the hollow chamber support assembly 1 located behind it having its insert component 7 and the clamping element 13, the front side of the stop panel 15 of which is apparent in FIG. 8.

Figure 9:
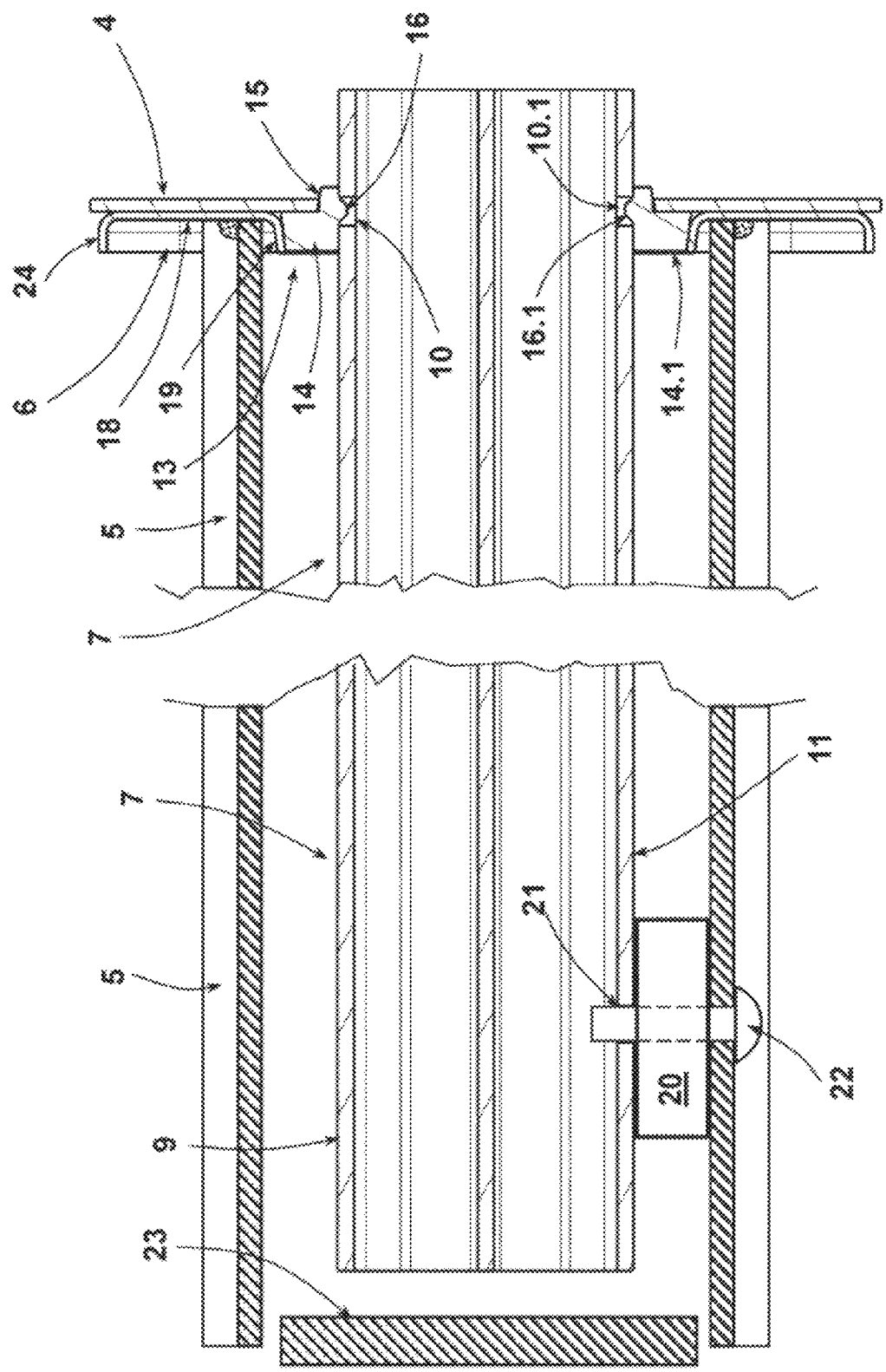
FIG. 9 shows a sectional illustration through the hollow chamber support assembly along line A-B of FIG. 8.

FIG. 9 shows, in a longitudinal section, the structure of the hollow chamber support assembly 1 having the insert component clamped by the clamping element 13. The flange clearance 12 of the flange plate 4 is formed by a flange 19 encircling the flange recess 12 and bent over from a base plate 18. As can be seen in FIG. 9, the peripheral flange 19 is inclined toward the interior of the hollow chamber support 5 toward the insert component 7. As a result, the flange recess 12 tapers in the direction toward the interior of the hollow chamber support 5. The clamping segments 14, 14.1 have a complementary shape on the outside and are also inclined in the same direction as the flange 19. The clamping element 13 is a plastic part and is produced with a slight oversize. If the clamping element 13 is seated in the flange clearance 12 when seated on the insert component 7, as shown in FIG. 9, a clamping pressure acting in the direction toward the insert component 7 is provided. If the clamping element 13 has not yet been sufficiently pressed into the flange opening 12 as a result of its mounting in the hollow chamber support 5, this occurs automatically when the bumper cross-member assembly 2 is mounted on the flange plate 6. The flange plate 6 then acts against the sections of the clamping segments 14, 14.1 projecting over the stop panel 15. FIG. 9 also shows that the peripheral surface of the stop panel 15 is also slightly inclined, contrary to the inclination of the outer sides of the clamping segments 14, 14.1. The stop panel 15 is thus used simultaneously for guiding and centering during the mounting of the bumper cross-member assembly with its flange plate 6 on the flange plate 4. When mounted on the flange plate 4, the flange plate 6 is located with its flange recess 17 on the outside to that position where the locking cams 16, 16.1 are located on the inside. Their engagement position is thus secured after the flange plate 6 has been mounted.

The insert component 7 is equipped with a plastic nut 20 on the outside in the region of its other end section, for example by means of an adhesive bond. The nut 20 is located at that point on the outside of the insert component—here on the lower wall 11—in which it has an opening 21 having an internal thread. The nut 20 is used as a spacer, so that the insert component 7 is held within the hollow chamber support 5 spaced apart from its inner wall, as is carried out at its other end section by the clamping element 13. A screw 22 is used to fix the insert component 7. For this purpose, the screw 22 extends through the hollow chamber support 5. The screw 22 only has small dimensions, for example has a diameter of 4 to 6 mm.

It is schematically shown in FIG. 9 that the end of the insert component 7 located in the hollow chamber support 5 is spaced apart from a terminus 23. The terminus 23 is shown schematically and can be provided by the hollow chamber support or by another component. The terminus does not have to be provided at right angles to the course of the hollow chamber support. The terminus 23 is only intended to show that a movement of the insert component 7 in the x direction into the hollow chamber support 5 is thereby limited. In case of an accident having a high force absorption in the x direction, the hollow chamber support 5 can therefore initially react independently and unaffected by the insert component 7, while the insert component 7 is not yet involved in a deformation. At best, the insert component 7 is displaced by the applied force in the x direction in the direction of the terminus 23. The plastic locking cams 16, 16.1 shear off in the process, as does the screw 22, which is weakly dimensioned for this purpose. Only when a correspondingly high force is applied do transverse forces above all also reach the insert component 7, which up to that point has not been deformed. For this reason, particularly high forces can be absorbed using the hollow chamber support assembly 1 without the longitudinal support formed by this assembly buckling in or buckling out.

Figure 10:
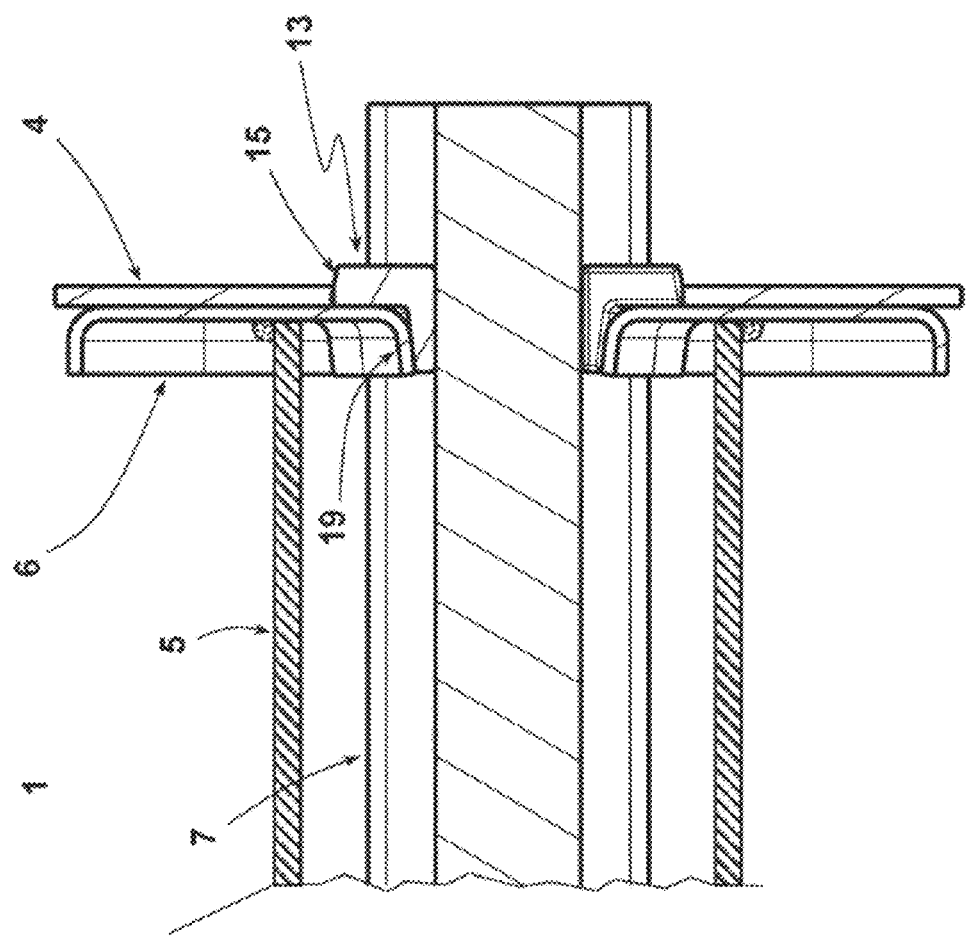
FIG. 10 shows a sectional illustration through the end section of the hollow chamber support assembly along line C-D of FIG. 8.

In the section shown in FIG. 10, it is apparent that the outside of the clamping segments 14, 14.1 is also inclined in the area of the waist, as is their above-described vertex area. Thus, in this example embodiment, a clamping force is also applied to the insert component in the region of its waist.

The flange 19 of the flange plate 4 enclosing the flange recess 12 is used to apply the clamping force. This thus forms the abutment necessary for applying the clamping force acting on the insert component 7.

To reinforce the flange plate 4, it has a peripheral flange 24 on the outside, which is bent in the same direction as the flange 19.

The present disclosure has been described using a longitudinal support of a vehicle as an example embodiment. From this, the simple and problem-free mounting of the insert component 7 in the hollow chamber support 5 becomes clear. If other forces have to be absorbed by the hollow chamber support assembly, another insert component can be used instead of the insert component 7, or the hollow chamber support 5 can be used without an insert component. The hollow chamber support assembly can be equipped with the insert component required for the vehicle being produced in each case during mounting. Either an insert component is inserted into the hollow chamber support before the mounting of the bumper cross-member assembly or it is not.

The description of the example embodiment also makes it clear that this concept can also be used with other supports in the vehicle.

The invention has been described on the basis of example embodiments. Without departing the scope of the claims, numerous further options and possibilities for implementing the invention result for a person skilled in the art, without having to explain or show them in greater detail in the context of this disclosure.

LIST OF REFERENCE NUMERALS 1, 1.1 hollow chamber support assembly
2 bumper cross-member assembly
3, 3.1 crash box
4, 4.1 flange plate
5 hollow chamber support
6 flange plate
7 insert component
8, 8.1 depression
9 wall
10, 10.1 locking opening
11 wall
12 flange recess
13 clamping element
14, 14.1 clamping segment
15 stop panel
16, 16.1 locking cam
17 flange recess
18 base plate
19 flange
20 nut
21 opening
22 screw
23 terminus
24 flange

The invention claimed is:
1. A hollow chamber support assembly for a vehicle, comprising:

a hollow chamber support,
an insert component designed as a hollow chamber profile, which is arranged in the hollow chamber support with outer sides of walls of the insert component spaced apart from an inner wall of the hollow chamber support, and
means for holding a first end section of the insert component on an end of the hollow chamber support in its arrangement provided in the hollow chamber support, which means are designed as clamping means and comprise a clamping element and an abutment element, wherein to clamp the insert component, the clamping element is supported on the abutment element and, in this supported arrangement, acts against the outer side of at least one wall of the insert component.

2. The hollow chamber support assembly of claim 1, wherein the abutment element is part of a flange plate which is arranged at a free end of the hollow chamber support and is connected thereto, and the at least one clamping element and the insert component engage in a flange recess of the flange plate.

3. The hollow chamber support assembly of claim 2, wherein at least one abutment surface provided by the flange plate for supporting the clamping element is formed by a flange or flange portion which is angled relative to a base plate of the flange plate and delimits the flange recess.

4. The hollow chamber support assembly of claim 3, wherein the flange or flange portion forming the abutment surface is part of a flange which peripherally encloses the flange recess.

5. The hollow chamber support assembly of claim 3, wherein an opening width of the flange recess is tapered by the flange or flange portion forming the abutment surface starting from the base plate.

6. The hollow chamber support assembly of claim 2, wherein the flange plate carries an outer peripheral flange which is bent over from the base plate.

7. The hollow chamber support assembly of claim 6, wherein the outer peripheral flange is bent over in a same direction as the flange or flange portion forming the at least one abutment surface.

8. The hollow chamber support assembly of claim 1, wherein the clamping element has at least two clamping segments opposite to one another with respect to a longitudinal axis of the insert component, which are each supported on an abutment surface portion such that a clamping force acting in a direction of the longitudinal axis of the insert component is provided by the clamping element for clamping the insert component.

9. The hollow chamber support assembly of claim 8, wherein the at least two clamping segments are part of a clamping sleeve which encompasses the insert component.

10. The hollow chamber support assembly of claim 9, wherein the clamping sleeve is formed slotted on one side.

11. The hollow chamber support assembly of claim 10, wherein an inner contour of the clamping sleeve is designed complementary to an outline geometry of the insert component.

12. The hollow chamber support assembly of claim 1, wherein the clamping element carries at least one locking cam on a side thereof facing towards the insert component, which cam engages in an opening of the insert component.

13. The hollow chamber support assembly of claim 1, wherein:

the abutment element is part of a flange plate which is arranged at a free end of the hollow chamber support and is connected thereto, and the at least one clamping element and the insert component engage in a flange recess of the flange plate,
the clamping element has at least two clamping segments opposite to one another with respect to a longitudinal axis of the insert component, which are each supported on an abutment surface portion such that a clamping force acting in a direction of the longitudinal axis of the insert component is provided by the clamping element for clamping the insert component, and
a stop panel is formed on a side of the at least two clamping segments facing towards the free end of the hollow chamber support into which the insert component has been inserted, and the stop panel of the clamping element projects beyond an outer contour thereof engaging in the flange recess of the flange plate.

14. The hollow chamber support assembly of claim 13 wherein the flange plate is a first flange plate, further comprising a second flange plate having a flange recess, wherein the second flange plate is connected to the first flange plate, wherein the outer contour of the stop panel or a portion thereof engages in the flange recess of the second flange plate, and wherein the clamping element is clamped with the second flange plate in relation to the abutment element.

15. The hollow chamber support assembly of claim 14, wherein the stop panel has a lateral surface which is inclined in relation to the longitudinal axis of the insert component with an inclination direction directed away from the first flange plate and toward the insert component.

16. The hollow chamber support assembly of claim 1, wherein the clamping element is a plastic part.

17. The hollow chamber support assembly of claim 1, wherein a second end section of the insert component is supported with at least one second holding means relative to the inner wall of the hollow chamber support.

18. The hollow chamber support assembly of claim 17, wherein the second holding means is a nut held on the outside of the insert component and a screw, which passes through a wall of the hollow chamber support, engages into the nut to fix the second end section of the insert component.

19. The hollow chamber support assembly of claim 1, wherein the hollow chamber profile of the insert component has multiple chambers.

20. The hollow chamber support assembly of claim 19, wherein the insert component has a cross-sectional area with a greater extension in the z direction than in the y direction.

21. The hollow chamber support assembly of claim 19, wherein the insert component has, on at least one wall, an inwardly directed slot-shaped groove following a longitudinal extension of the insert component.

22. The hollow chamber support assembly of claim 1, wherein the insert component is an aluminum extruded profile.

23. The hollow chamber support assembly of claim 1, wherein the insert component has a non-linear longitudinal extension.

24. The hollow chamber support assembly of claim 1, wherein the hollow chamber support is produced from at least two shell components.

* * * * *